(12) United States Patent
Hassanzadeh et al.

(10) Patent No.: US 12,326,942 B2
(45) Date of Patent: Jun. 10, 2025

(54) IDENTIFYING AND ASSESSING COSTS ASSOCIATED WITH CORRECTING VULNERABILITIES IN MACHINE LEARNING MODELS

(71) Applicant: Accenture Global Solutions Limited, Dublin (IE)

(72) Inventors: Amin Hassanzadeh, Arlington, VA (US); Changwei Liu, Fairfax, VA (US); Louis Divalentin, Arlington, VA (US); Benjamin Glen McCarty, Washington, DC (US); Malek Ben Salem, Falls Church, VA (US)

(73) Assignee: Accenture Global Solutions Limited, Dublin (IE)

( * ) Notice: Subject to any disclaimer, the term of this patent is extended or adjusted under 35 U.S.C. 154(b) by 255 days.

(21) Appl. No.: 18/054,710

(22) Filed: Nov. 11, 2022

(65) Prior Publication Data

US 2024/0160744 A1 May 16, 2024

(51) Int. Cl.
*G06F 21/57* (2013.01)
*G06N 5/022* (2023.01)

(52) U.S. Cl.
CPC .......... *G06F 21/577* (2013.01); *G06N 5/022* (2013.01); *G06F 2221/034* (2013.01)

(58) Field of Classification Search
CPC ... G06F 21/577; G06F 2221/034; G06N 7/01; G06N 20/00
See application file for complete search history.

(56) References Cited

U.S. PATENT DOCUMENTS

| | | | |
|---|---|---|---|
| 2020/0143045 A1* | 5/2020 | Joye | G06F 21/75 |
| 2022/0292309 A1* | 9/2022 | Ashrafi | G06F 18/23 |
| 2022/0414531 A1* | 12/2022 | Ong | G06N 20/00 |

* cited by examiner

*Primary Examiner* — Ellen Tran
(74) *Attorney, Agent, or Firm* — POLSINELLI PC

(57) ABSTRACT

A device may receive a machine learning model, training data, a pipeline configuration for the machine learning model, and impact costs associated with customer preferences, and may perform assessments of the machine learning model to identify attacks associated with the machine learning model and vulnerabilities associated with the attacks. The device may map the vulnerabilities to threats, may map the threats to the impact costs, and may determine success rates of the threats. The device may calculate probabilities of the threats based on the vulnerabilities and the success rates, and may calculate risk costs of the attacks based on the probabilities and the impact costs. The device may identify controls for limiting the vulnerabilities and control costs. The device may determine a total cost for eliminating the risk costs based on the risk costs and the control costs, and may perform actions based on the total cost.

20 Claims, 14 Drawing Sheets

FIG. 1J

IDENTIFYING AND ASSESSING COSTS ASSOCIATED WITH CORRECTING VULNERABILITIES IN MACHINE LEARNING MODELS

BACKGROUND

Security may be important for a machine learning model, especially when it comes to inherent vulnerabilities associated with machine learning models. Machine learning model vulnerabilities may pose challenges when machine learning models process sensitive information that needs to be protected.

SUMMARY

Some implementations described herein relate to a method. The method may include receiving a machine learning model, training data utilized to train the machine learning model, a pipeline configuration for the machine learning model, and impact costs associated with customer preferences for the machine learning model, and performing one or more assessments of the machine learning model to identify attacks associated with the machine learning model and vulnerabilities associated with the attacks. The method may include mapping the vulnerabilities to corresponding threats, and mapping the corresponding threats to the impact costs. The method may include determining success rates of the corresponding threats, and calculating corresponding probabilities of the corresponding threats being successful based on the vulnerabilities and the success rates. The method may include calculating risk costs of the attacks based on the corresponding probabilities and the impact costs, and identifying controls for limiting the vulnerabilities. The method may include identifying control costs associated with the controls, and processing the risk costs and the control costs, with an optimization model, to determine a total cost for eliminating a portion or all of the risk costs. The method may include performing one or more actions based on the total cost.

Some implementations described herein relate to a device. The device may include one or more memories and one or more processors coupled to the one or more memories. The one or more processors may be configured to receive a machine learning model, training data utilized to train the machine learning model, a pipeline configuration for the machine learning model, and impact costs associated with customer preferences for the machine learning model, and perform one or more assessments of the machine learning model to identify attacks associated with the machine learning model and vulnerabilities associated with the attacks. The one or more processors may be configured to utilize a graph model with logical relations to map the vulnerabilities to corresponding threats, and utilize the graph model with the logical relations to map the corresponding threats to the impact costs. The one or more processors may be configured to determine success rates of the corresponding threats, and calculate corresponding probabilities of the corresponding threats being successful based on the vulnerabilities and the success rates. The one or more processors may be configured to calculate risk costs of the attacks based on the corresponding probabilities and the impact costs, and identify controls for limiting the vulnerabilities. The one or more processors may be configured to identify control costs associated with the controls, and process the risk costs and the control costs, with an optimization model, to determine a total cost for eliminating a portion or all of the risk costs. The one or more processors may be configured to perform one or more actions based on the total cost.

Some implementations described herein relate to a non-transitory computer-readable medium that stores a set of instructions for a device. The set of instructions, when executed by one or more processors of the device, may cause the device to receive a machine learning model, training data utilized to train the machine learning model, a pipeline configuration for the machine learning model, and impact costs associated with customer preferences for the machine learning model, and perform one or more assessments of the machine learning model to identify attacks associated with the machine learning model and vulnerabilities associated with the attacks. The set of instructions, when executed by one or more processors of the device, may cause the device to map the vulnerabilities to corresponding threats, and map the corresponding threats to the impact costs. The set of instructions, when executed by one or more processors of the device, may cause the device to determine success rates of the corresponding threats, and calculate corresponding probabilities of the corresponding threats being successful based on the vulnerabilities and the success rates. The set of instructions, when executed by one or more processors of the device, may cause the device to calculate risk costs of the attacks based on the corresponding probabilities and the impact costs, and identify controls for limiting the vulnerabilities. The set of instructions, when executed by one or more processors of the device, may cause the device to identify control costs associated with the controls, and process the risk costs and the control costs, with an optimization model, to determine a total cost for eliminating a portion or all of the risk costs. The set of instructions, when executed by one or more processors of the device, may cause the device to perform one or more actions based on the total cost.

BRIEF DESCRIPTION OF THE DRAWINGS

FIGS. 1A-1J are diagrams of an example implementation described herein.

DETAILED DESCRIPTION

Figure 1A:
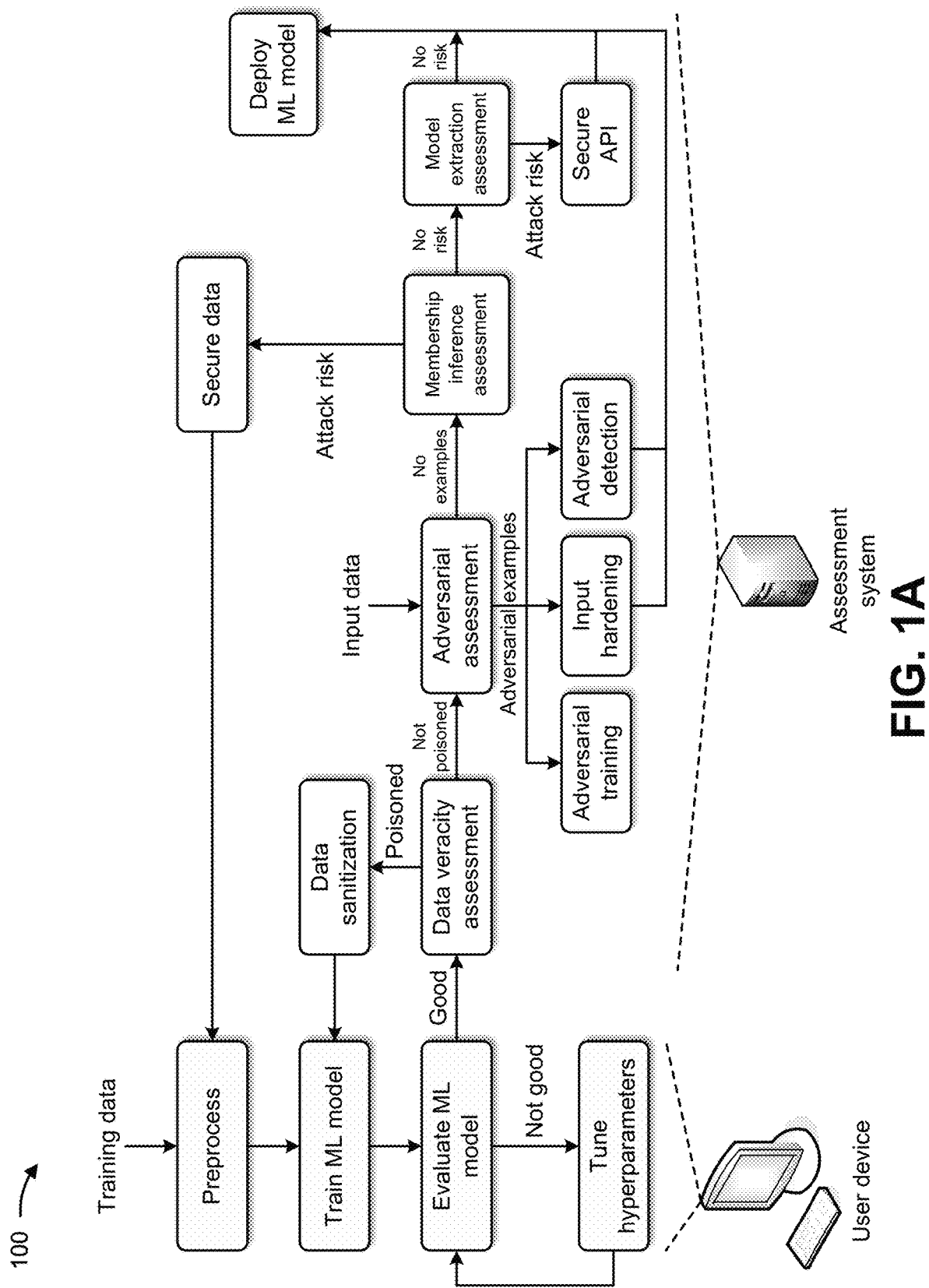

The following detailed description of example implementations refers to the accompanying drawings. The same reference numbers in different drawings may identify the same or similar elements.

Examples of attacks on machine learning models include model manipulation, data poisoning, model extraction, membership inference, and/or the like. Model manipulation (e.g., adversarial machine learning model) includes modifying the training data (e.g., that is undetectable to the human eye) to cause misclassifications by the machine learning model. Data poisoning includes modifying or injecting data into the training data to bias the machine learning model to make a future misclassification. Model extraction includes using predictions of a machine learning model to extract and replicate information about the machine learning model. Membership inference includes analyzing the behavior of a machine learning model and predicting whether a point is included in training data. However, current techniques for detecting and defending against machine learning model attacks are not integrated into a platform for the machine learning model, and are unable to detect and correct all of the machine learning model attacks. Furthermore, current techniques for defending against machine learning attacks fail to assess costs associated with defending against the attacks.

Therefore, current techniques for detecting and defending against machine learning model attacks consume computing resources (e.g., processing resources, memory resources, communication resources, and/or the like), networking resources, and/or the like associated with failing to detect and correct one or more machine learning model attacks, implementing a compromised machine learning model, utilizing incorrect results generated by the compromised machine learning model, handling theft of confidential information associated with the compromised machine learning model, performing expensive and possibly unnecessary processes to correct machine learning attacks, and/or the like.

Some implementations described herein relate to an assessment system that identifies and assesses costs associated with correcting vulnerabilities in machine learning models. For example, the assessment system may receive a machine learning model, training data utilized to train the machine learning model, a pipeline configuration for the machine learning model, and impact costs associated with customer preferences for the machine learning model. The assessment system may perform one or more assessments of the machine learning model to identify attacks associated with the machine learning model and vulnerabilities associated with the attacks, and may utilize a graph model with logical relations to map the vulnerabilities to corresponding threats. The assessment system may utilize the graph model with the logical relations to map the corresponding threats to the impact costs, and may determine success rates of the corresponding threats. The assessment system may calculate corresponding probabilities of the corresponding threats being successful based on the vulnerabilities and the success rates, and may calculate risk costs of the attacks based on the corresponding probabilities and the impact costs. The assessment system may identify controls for limiting the vulnerabilities, and may identify control costs associated with the controls. The assessment system may process the risk costs and the control costs, with an optimization model, to determine a total cost for eliminating a portion or all of the risk costs, and may perform one or more actions based on the total cost.

In this way, the assessment system identifies and assesses costs associated with correcting vulnerabilities in machine learning models. The assessment system may identify attacks associated with a machine learning model and vulnerabilities associated with the attacks, and may map the vulnerabilities to threats and the threats to impact costs. The assessment system may determine success rates of the threats, and may calculate probabilities of the threats being successful based on the vulnerabilities and the success rates. The assessment system may calculate risk costs of the attacks based on the probabilities and the impact costs, and may identify controls for limiting the vulnerabilities and control costs associated with the controls. The assessment system may process the risk costs and the control costs, with an optimization model, to determine a total cost for eliminating a portion or all of the risk costs. This, in turn, conserves computing resources, networking resources, and/or the like that would otherwise have been consumed in failing to detect and correct one or more machine learning model attacks, implementing a compromised machine learning model, utilizing incorrect results generated by the compromised machine learning model, handling theft of confidential information associated with the compromised machine learning model, performing expensive and possibly unnecessary processes to correct machine learning attacks, and/or the like.

FIGS. 1A-1J are diagrams of an example 100 associated with identifying and assessing costs associated with correcting vulnerabilities in machine learning models. As shown in FIGS. 1A-1J, example 100 includes a user device associated with an assessment system. The user device may include a wireless communication device, a mobile phone, a user equipment, a laptop computer, a tablet computer, a desktop computer, and/or the like. The assessment system may include a system that identifies and assesses costs associated with correcting vulnerabilities in machine learning models. Further details of the user device and the assessment system are provided elsewhere herein.

As shown in FIG. 1A, the user device may store, have access to, and/or utilize a machine learning (ML) model. The user device may utilize training data to train the machine learning model and to generate a trained machine learning model. In some implementations, rather than training the machine learning model, the user device may obtain the trained machine learning model from another system or device that trained the machine learning model. In this case, the user device may provide the other system or device with the training data for use in training the machine learning model, and may provide the other system or device with updated training data to retrain the machine learning model in order to update the machine learning model. As shown in FIG. 1A, the user device may preprocess the training data so that the training data is in a format that may be understood by the machine learning model. The user device may train the machine learning model with the preprocessed training data to generate a trained machine learning model.

As further shown in FIG. 1A, the user device may evaluate the trained machine learning model. For example, the user device may process validation data, with the trained machine learning model, to validate that the trained machine learning model is operating correctly. If the trained machine learning model is operating correctly, the user device may process the trained machine learning model, with test data, to further ensure that the trained machine learning model is operating correctly. If the trained machine learning model is operating incorrectly (e.g., generating erroneous outputs), the user device may modify the trained machine learning model and may revalidate and/or retest the modified machine learning model based on the validation data and/or the test data. For example, the user device may modify the trained machine learning model by tuning hyperparameters associated with the trained machine learning model. If the trained machine learning model is operating correctly (e.g., good), the user device may provide, to the assessment system, the trained machine learning model, the training data, and/or pipeline data identifying a configuration pipeline for the machine learning model.

As further shown in FIG. 1A, the assessment system may include a data veracity assessment component that receives the trained machine learning model, the training data, and the pipeline data from the user device. The data veracity assessment component may perform a data veracity assessment of the training data to determine whether the training data is poisoned or clean (e.g., not poisoned). If the training data is poisoned, the assessment system may utilize a data sanitization component to remove the poisoned data from the training data. If the training data is not poisoned, the data veracity assessment component may provide the trained machine learning model, the training data, and the pipeline data to an adversarial assessment component. Further details of the data veracity assessment component and the data sanitization component are provided elsewhere herein.

As further shown in FIG. 1A, the adversarial assessment component may receive input data and the trained machine learning model, and may determine whether the input data includes adversarial examples. If adversarial examples are included in the input data, the adversarial assessment component may utilize an adversarial detection component and/or an input hardening component as defenses to the adversarial examples if the machine learning model cannot be retrained. If adversarial examples are included in the input data and the machine learning model can be retrained, the adversarial assessment component may utilize an adversarial training component to retrain the machine learning model (e.g., to provide a more robust model). Further details of the adversarial assessment component, the adversarial detection component, an input hardening component, and the adversarial training component are provided elsewhere herein.

As further shown in FIG. 1A, if adversarial examples are not included in the input data, a membership inference assessment component may receive the trained machine learning model and a distribution of the training data, and may determine whether the trained machine learning model is at risk of a membership inference attack. If the trained machine learning model is at risk of a membership inference attack, a secure data component of the assessment system may be utilized to secure the training data. Further details of the membership inference assessment component and the secure data component are provided elsewhere herein.

As further shown in FIG. 1A, if the trained machine learning model is not at risk of a membership inference attack, a model extraction assessment component of the assessment system may receive the trained machine learning model and the pipeline data, and may determine whether the trained machine learning model is at risk of a model extraction attack. For example, the model extraction assessment component may determine a quantity of queries required to extract the machine learning model. If the trained machine learning model is at risk of a model extraction attack, a secure application programming interface (API) component of the assessment system may be utilized to secure the machine learning model. If the trained machine learning model is not at risk of a model extraction attack, the assessment system may cause the machine learning model to be deployed. Further details of the model extraction assessment component and the secure API component are provided elsewhere herein.

The assessment system may integrate several techniques and methods for analyzing security of a machine learning model to produce an all-in-one comprehensive analysis system. For example, the assessment system may test the machine learning model for current data poisoning attacks, adversarial attacks, model memorization attacks, membership inference attacks, model extraction attacks, and/or the like. The assessment system may strategically perform attack assessments at proper locations of the machine learning model pipeline. The assessment system may provide remediations and/or suggestions to further protect machine learning models against attacks.

Figure 1B:
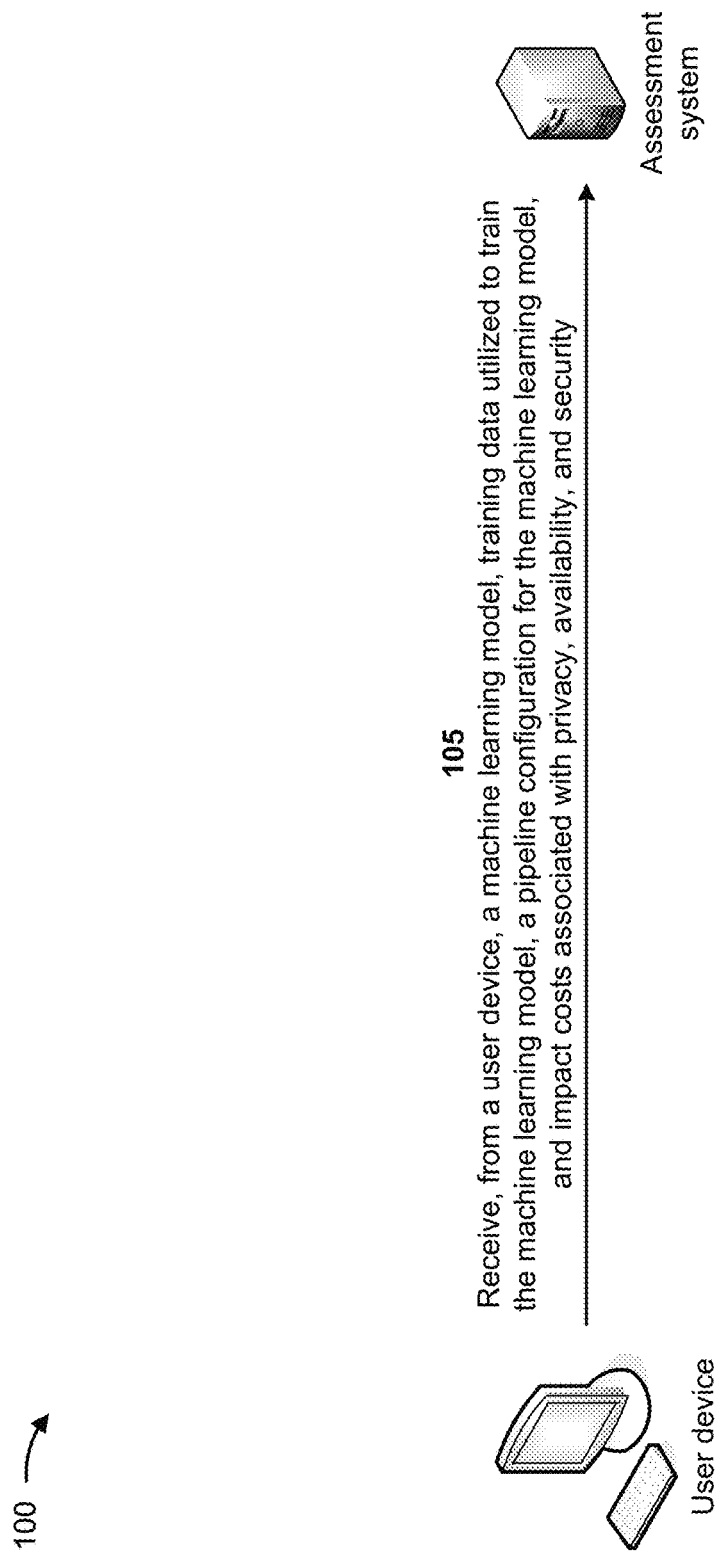

As shown in FIG. 1B, and by reference number 105, the assessment system may receive, from the user device, a machine learning model, training data utilized to train the machine learning model, a pipeline configuration (e.g., the pipeline data) for the machine learning model, and impact costs associated with customer preferences for the machine learning model (e.g., privacy, availability, security, and/or the like). The machine learning model may include any machine learning model, such as, for example, a machine learning model associated with a surveillance system (e.g., using facial recognition), a machine learning model associated with an X-ray reading system (e.g., for disease diagnosis), and/or the like. The training data may include the data utilized to train the machine learning model to perform a particular function. For example, the training data for a surveillance system machine learning model may include images of faces of different individuals, the training data for an X-ray reading system machine learning model may include X-rays associated with different diseases, and/or the like. The pipeline configuration may include data identifying how the machine learning model is trained, validated, and/or tested, parameters associated with the machine learning model, and/or the like. The impact costs may include a value associated with a customer's desired privacy level of the machine learning model (e.g., a greater value may indicate a greater privacy loss), a value associated with a customer's desired availability of the machine learning model (e.g., a greater value may indicate more availability of the machine learning model for the customer), a value associated with a security level of the machine learning model (e.g., a greater value may indicate a greater security loss), and/or the like.

The user device may provide the machine learning model, the training data, the pipeline configuration, and the impact costs to the assessment system with a request to evaluate the machine learning model, the training data, and the pipeline configuration based on the impact costs. The assessment system may receive the request, the machine learning model, the training data, the pipeline configuration, and the impact costs from the user device. Alternatively, the assessment system may request the machine learning model, the training data, the pipeline configuration, and the impact costs from the user device, and may receive the machine learning model, the training data, the pipeline configuration, and the impact costs based on the request. In some implementations, the assessment system may store the machine learning model, the training data, the pipeline configuration, and the impact costs in a data structure (e.g., a database, a table, a list, and/or the like) associated with the assessment system.

Figure 1C:
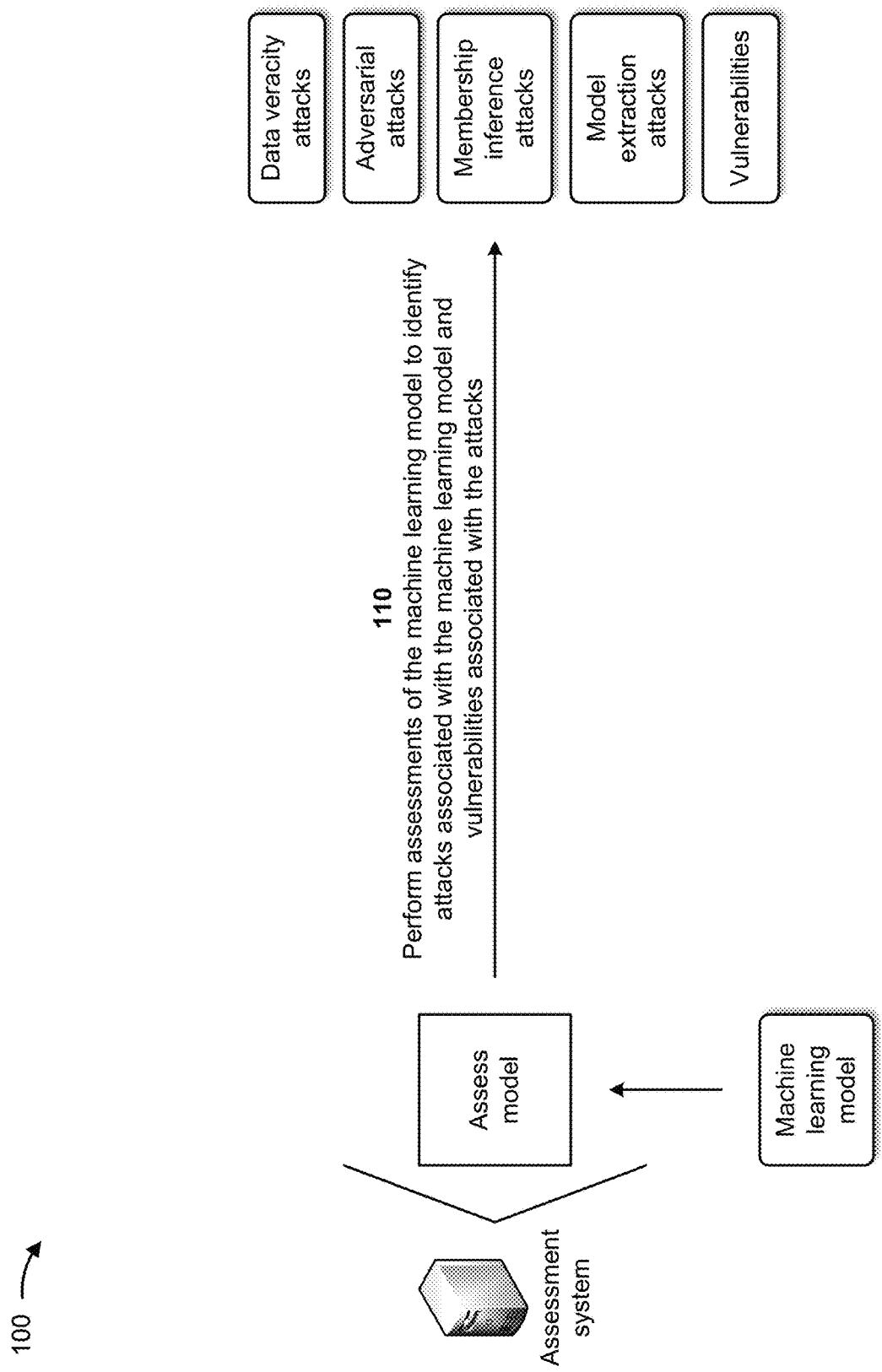

As shown in FIG. 1C, and by reference number 110, the assessment system may perform assessments of the machine learning model to identify attacks associated with the machine learning model and vulnerabilities associated with the attacks. For example, the assessment system may identify data veracity attacks associated with the training data, adversarial attacks associated with the machine learning model, membership inference attacks associated with the machine learning model, model extraction attacks associated with the machine learning model, and/or the like. Each of the attacks may be associated with one or more vulnerabilities of the machine learning model, such as vulnerabilities associated with security of the machine learning model, privacy of the machine learning model, the training data, a type of machine learning model, and/or the like.

In some implementations, the assessment system may perform a data veracity assessment of the training data to identify poisoned data from the training data. For example, the assessment system may utilize the data veracity assessment component to perform the data veracity assessment of the training data to identify poisoned data from the training data. Data poisoning is an attack that tries to manipulate the training data in order to control a prediction behavior of a trained machine learning model such that the machine learning model will label malicious examples into desired classes. A data poisoning attack can be launched by injecting new data (e.g., aimed at corrupting the machine learning model) in the training data, changing labels of existing real data in the training data, modifying the training data, submitting manipulated data through approved channels, and/or the like. A machine learning model trained using compromised training data can be induced to make incorrect predictions that cause detection failures, create financial losses for the organization, trigger unpredictable behavior, and/or the like. Data poisoning attacks may include a denial-of-service attack (e.g., where a predictive accuracy of the machine learning model will decrease for any input or most inputs), a backdoor/Trojan horse attack (e.g., where a predictive accuracy of the machine learning model will decrease only for inputs selected by an adversary), a data injection attack (e.g., where an attacker manipulates some aspects of the training data in order to cause the machine learning model to output a faulty classifier), a data modification attack (e.g., where an attacker can control labels assigned to a fraction of the training data), and/or the like.

The data veracity assessment component may perform the data veracity assessment of the training data before the machine learning model is implemented in production. The data veracity assessment component may utilize different techniques, that depend on data types of the training data, to identify poisoned data in the training data. For example, when the data type is tabular or discrete data, the data veracity assessment component may process the tabular or discrete training data, with a counterfactual explanation model, to identify poisoned data in the tabular or discrete training data. A counterfactual explanation is a technique utilized to interpret a machine learning model and to detect trigger features in tabular or discrete datasets for different targets. A counterfactual explanation may provide "what if" feedback of the form "if an input datapoint were x' instead of x, then a machine learning model's output would be y' instead of y." When the data type is image, audio, or sensor data, the data veracity assessment component may process the image, audio, or sensor training data, with an activation clustering model, to identify poisoned data in the image, audio, or sensor training data. Activation clustering includes analyzing neural network activations of training data to determine whether the training data has been poisoned, and, if so, which datapoints are poisoned. Activation weights for poisoned training data may break up into distinguishable clusters, while activation weights for clean training data may not break up into clusters.

In some implementations, the assessment system may perform an adversarial assessment of the machine learning model to identify adversarial attacks. For example, the adversarial assessment component of the assessment system may perform the adversarial assessment of the machine learning model to identify the adversarial attacks associated with the machine learning model. An adversarial attack may include providing, as inputs to a machine learning model, adversarial examples that an attacker has intentionally designed to cause the machine learning model to make a mistake. With an adversarial attack, a machine learning model may make bad decisions (e.g., incorrect predictions) due to slight changes (e.g., adding perturbations) in inputs provided to the machine learning model.

The adversarial attacks may include a white-box attack (e.g., where attackers have full knowledge about the machine learning model, including parameters and hyperparameters of the machine learning model), a black-box attack (e.g., where attackers know almost nothing about the machine learning model except for some features of the machine learning model), an untargeted attack (e.g., that includes a predicted class of a benign input to some other classes without a specific target class), a targeted attack (e.g., that includes a predicted class of a benign input to a targeted class different from an original class), and/or the like. In some implementations, the adversarial attacks may include a fast gradient sign method attack, a basic iterative method attack, a projected gradient descent attack, a Jacobian saliency map approach attack, a Carlini-Wagner attack, a boundary attack, an adaptive attack (e.g., designed to evade color depth reduction), and/or the like.

In some implementations, the assessment system may perform a membership inference assessment of the machine learning model to identify membership inference attacks associated with the machine learning model. For example, the membership inference assessment component of the assessment system may perform the membership inference assessment of the machine learning model to identify the membership inference attacks. A membership inference attack may include determining whether data was used as training data for the machine learning model. For example, a membership interference attack may include inferring a health condition diagnosis. If an attacker knows certain information about a person, the attacker may input the information into a machine learning model identifying cancer patients. If the attacker can conclude that the person is a member of the machine learning model outputs, the attacker may infer that the person has cancer. In another example, an insurance company seeking customers may utilize a competitor's machine learning model to determine clients of the competitor. If a person is identified as a client of the competitor, the insurance company could target the person with more enticing promotions. In still another example, if a machine learning model reveals some subject and a separate database contains other information regarding the subject, combining the other information with the subject may lead to a privacy breach.

The membership inference attacks may include a baseline attack, a fixed noise attack, an additive noise attack, an output probability vector attack, and/or the like. A baseline attack is an unsophisticated attack that infers membership based on whether or not a prediction was made correctly. If the prediction is correct, an observation may be inferred to be a member. If the prediction is incorrect, the observation may be inferred to be a non-member. A fixed noise attack includes adding a quantity of noise to an observation and monitoring how a prediction differs from an original unperturbed data prediction. If a difference between the predictions decreases significantly, an attacker may determine that an original data observation is a member and that the noise is a non-member. An additive noise attack includes adding incremental levels of noise to an observation and monitoring when a predicted class changes. The additive noise attack may require different quantities of noise to change a predicted class label between members and non-members. An output probability vector attack includes utilizing a probability vector output by the machine learning model to determine membership. Members and non-members may have differently distributed probability vectors.

In some implementations, the assessment system may perform a model extraction assessment of the machine learning model to identify model extraction attacks. For example, the model extraction assessment component may perform the model extraction assessment of the machine learning model to identify the model extraction attacks. A model extraction attack may include stealing a confidential machine learning model. An attacker may utilize queries to create a series of input-response pairs for the machine learning model, and may train a new machine learning model based on results of the queries. The new machine learning model may function similarly to the machine learning model. This enables the attacker to interact with and reverse engineer the machine learning model. Surrogate and shadow models reverse engineered from the machine learning model may be used to evade per-usage pricing models for the machine learning model. A competitor's reverse engineered model may reproduce functionality of the machine learning model, enabling the competitor to offer competing products. The surrogate and shadow models can be used to conduct experiments and optimize poisoning and manipulation attacks on the machine learning model.

When performing the model extraction assessment of the machine learning model to identify the model extraction attacks, the assessment system may determine model extraction attacks of the machine learning model at different interaction levels and threat scenarios, may determine reduced risk usage thresholds for individual users interacting with the machine learning model, may determine threats an attacker must take to extract confidential information, and/or the like. For example, the assessment system may identify a query threshold for a minimum viable strong attack on accuracy and fidelity metrics at difference risk tolerances. The assessment system may analyze artifacts produced during the training process to evaluate the query thresholds for the machine learning model based on a threat scenario for the machine learning model.

The model extraction attacks may include open source datasets, associated with the machine learning model, that resemble a task, competitor data associated with the machine learning model, unsophisticated random inputs associated with the machine learning model, binary hard labels associated with the machine learning model (e.g., only one response of a highest likelihood classification), probability vectors associated with the machine learning model (e.g., likelihoods of each class), random query selection associated with the machine learning model, adaptive queries associated with the machine learning model, and/or the like.

Figure 1D:
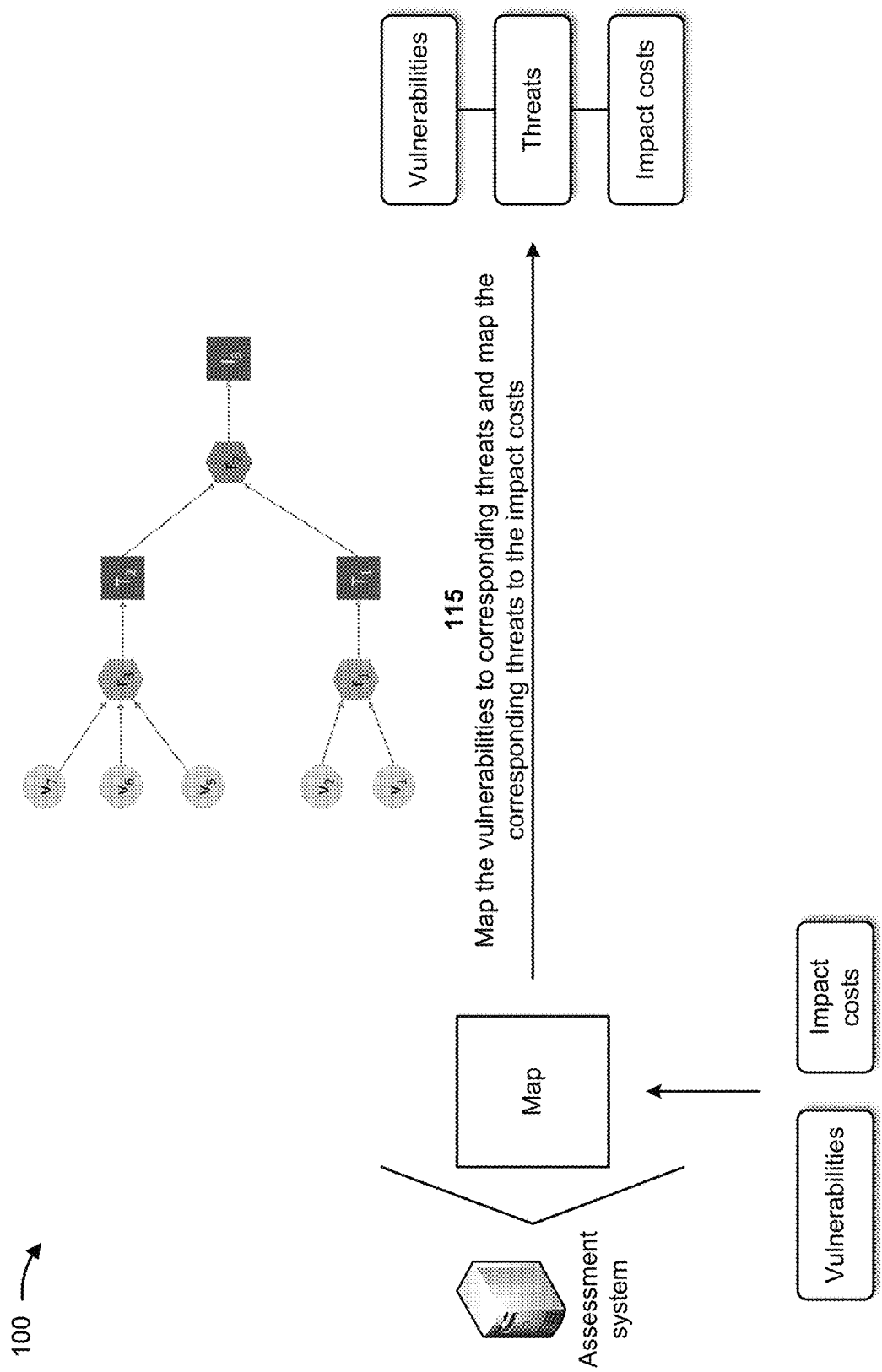

As shown in FIG. 1D, and by reference number 115, the assessment system may map the vulnerabilities to corresponding threats and may map the corresponding threats to the impact costs. For example, the attacks may be associated with vulnerabilities of the machine learning model, and a threat to the machine learning model may be caused by one or more vulnerabilities of the machine learning model. Thus, each of the attacks may be associated with one or more threats. A threat may independently cause negative impacts on the machine learning model or may cause negative impacts on the machine learning model in conjunction with one or more other threats. In some implementations, each of the corresponding threats may include properties associated an accuracy of the machine learning model, a threat severity, one of the customer preferences, and/or the like.

In some implementations, the assessment system may utilize a graph model with logical relations to map the vulnerabilities to the corresponding threats, and may utilize the graph model with the logical relations to map the corresponding threats to the impact costs. A graph model may include a model that describes an arbitrary domain as a connected graph of nodes and relationships with properties and labels. As further shown in FIG. 1D, a first logical relation ($r_1$) (e.g., AND, OR, and/or the like) may map a first set of vulnerabilities (e.g., $v_1$ and $v_2$) to a first threat ($T_1$), and a third logical relation ($r_3$) may map a second set of vulnerabilities (e.g., $v_5$, $v_6$, and $v_7$) to a second threat ($T_2$). A second logical relation ($r_2$) may map the first threat ($T_1$) and the second threat ($T_2$) to a third impact cost ($i_3$).

Figure 1E:
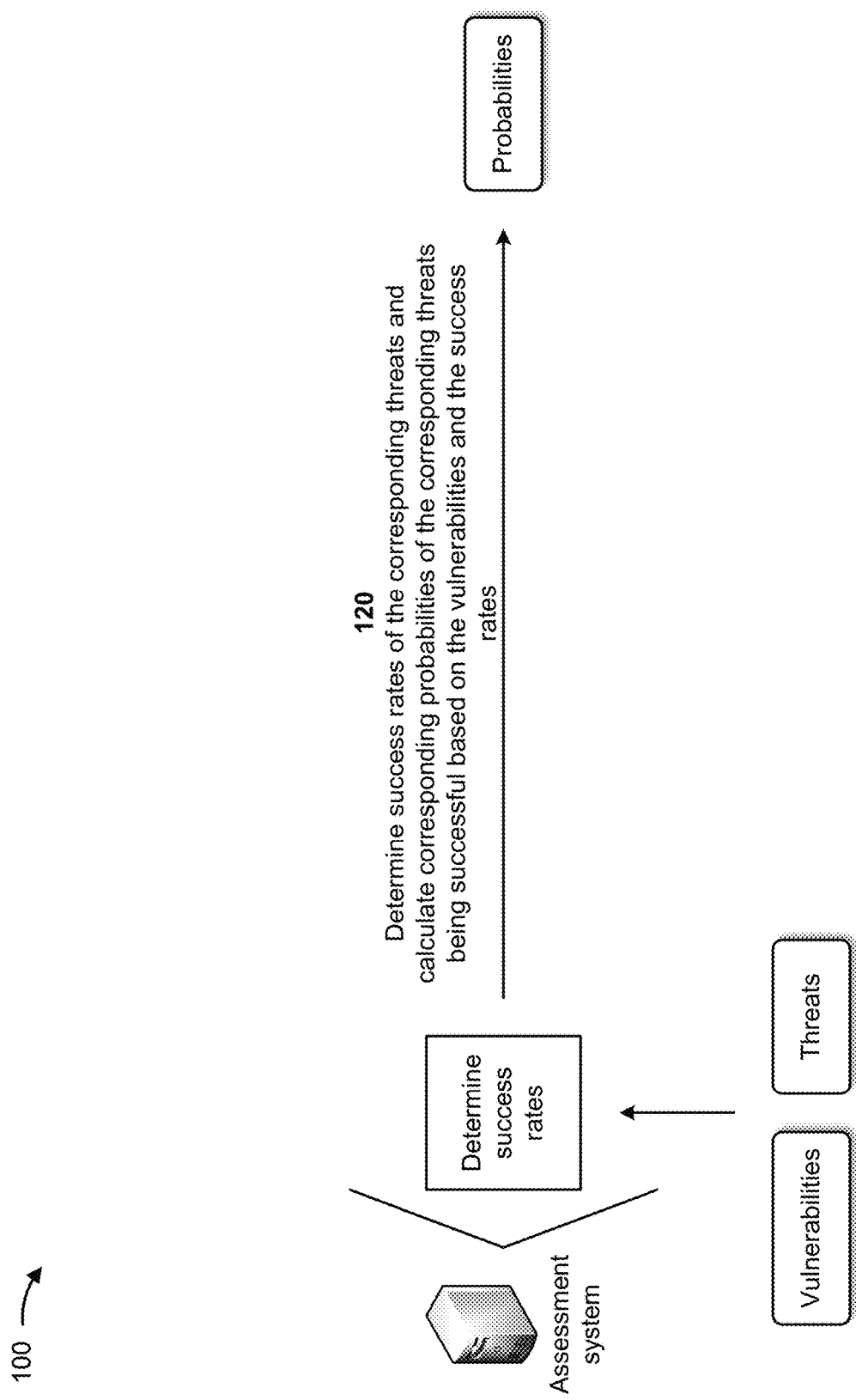

As shown in FIG. 1E, and by reference number 120, the assessment system may determine success rates of the corresponding threats and may calculate corresponding probabilities of the corresponding threats being successful based on the vulnerabilities and the success rates. For example, when determining the success rates of the corresponding threats, the assessment system may identify (e.g., based on historical success rates associated with historical threats to machine learning models) corresponding success rates associated with the corresponding threats, and may assign the corresponding success rates to the corresponding threats. The assessment system may determine weights for the corresponding success rates based on difficulties associated with launching the corresponding attacks associated with a threat (e.g., hardware requirements for the corresponding attack, times and costs required to implement the corresponding attack, technical difficulties of the corresponding attack, and/or the like). The assessment system may assign the weights to the corresponding success rates to determine the success rates of the corresponding attacks. For example, the assessment system may multiply the weights and the corresponding success rates to determine the success rates of the corresponding attacks.

When calculating the corresponding probabilities of the corresponding threats being successful based on the vulnerabilities and the success rates, the assessment system may calculate probabilities of the vulnerabilities being successful based on the success rates. The assessment system may combine the vulnerability probabilities to calculate the corresponding probabilities of the corresponding threats being successful. For example, the assessment system may combine the vulnerability probabilities together to calculate the corresponding probabilities of the corresponding threats being successful. In one example, if a corresponding threat (T) is associated with four vulnerabilities (e.g., $v_1$, $v_2$, $v_3$, and $v_4$), the assessment system may calculate a probability of threat T being successful ($P_T$) as follows:

$$P_T = \bigcup_j^{j \in v_T} P_{v_i} = P(v_1 \cup v_2 \cup v_3 \cup v_4),$$

where $P_{v_i}$ corresponds to an ith vulnerability probability and $\cup$ presents logical OR.

Figure 1F:
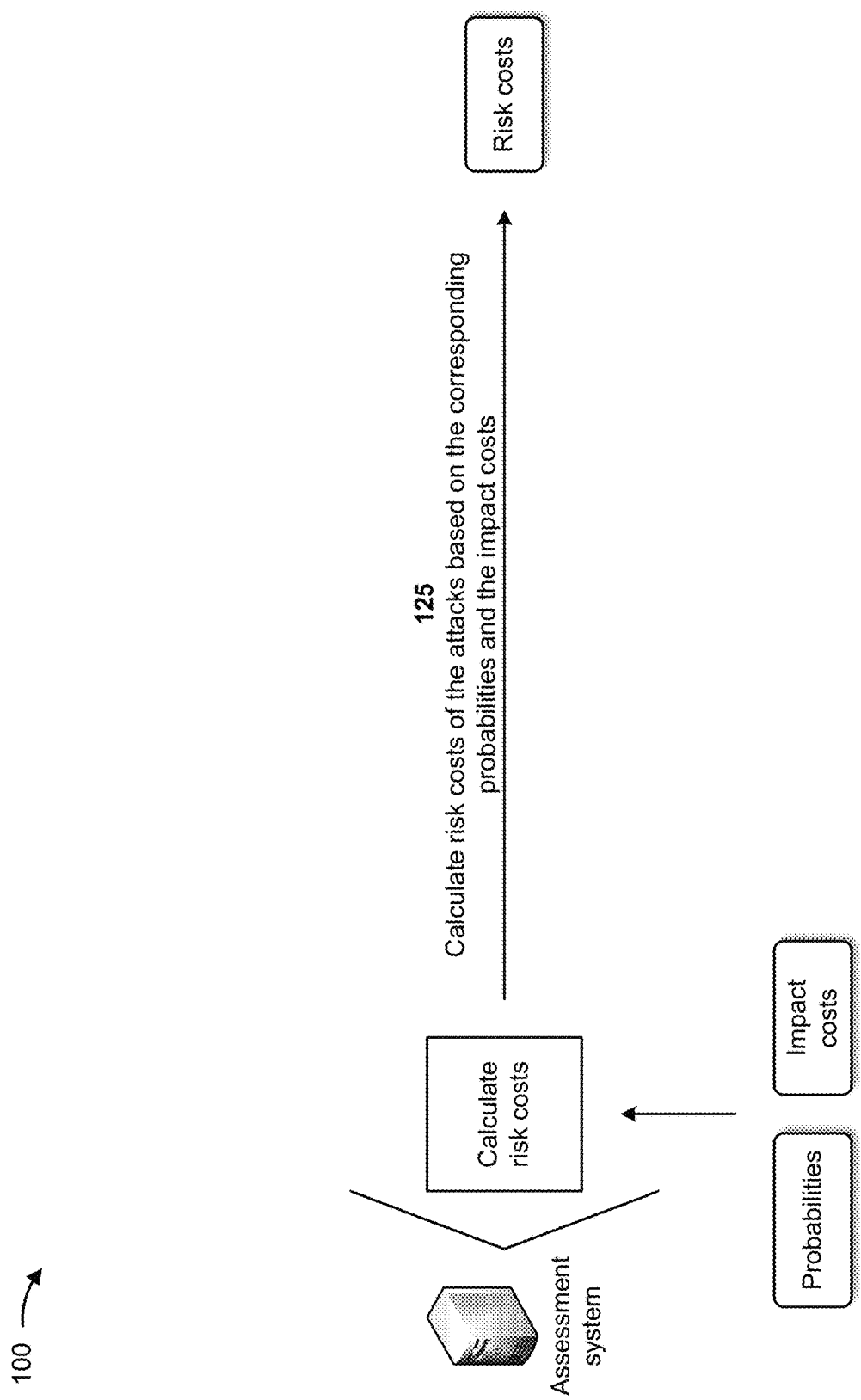

As shown in FIG. 1F, and by reference number 125, the assessment system may calculate risk costs of the attacks based on the corresponding probabilities and the impact costs. For example, when calculating the risk costs of the attacks based on the corresponding probabilities and the impact costs, the assessment system may multiply the corresponding probabilities and the impact costs to calculate the risk costs of the attacks. In some implementations, each of the risk costs may be based on a privacy factor identified in the customer preferences, a security factor identified in the customer preferences, an availability factor identified in the customer preferences, the training data, a type of the machine learning model, a platform hosting the machine learning model, and/or the like. For example, one customer may allot a greater impact cost to privacy matters (e.g., since the customer handles sensitive client information) than a customer that handles public information.

Figure 1G:
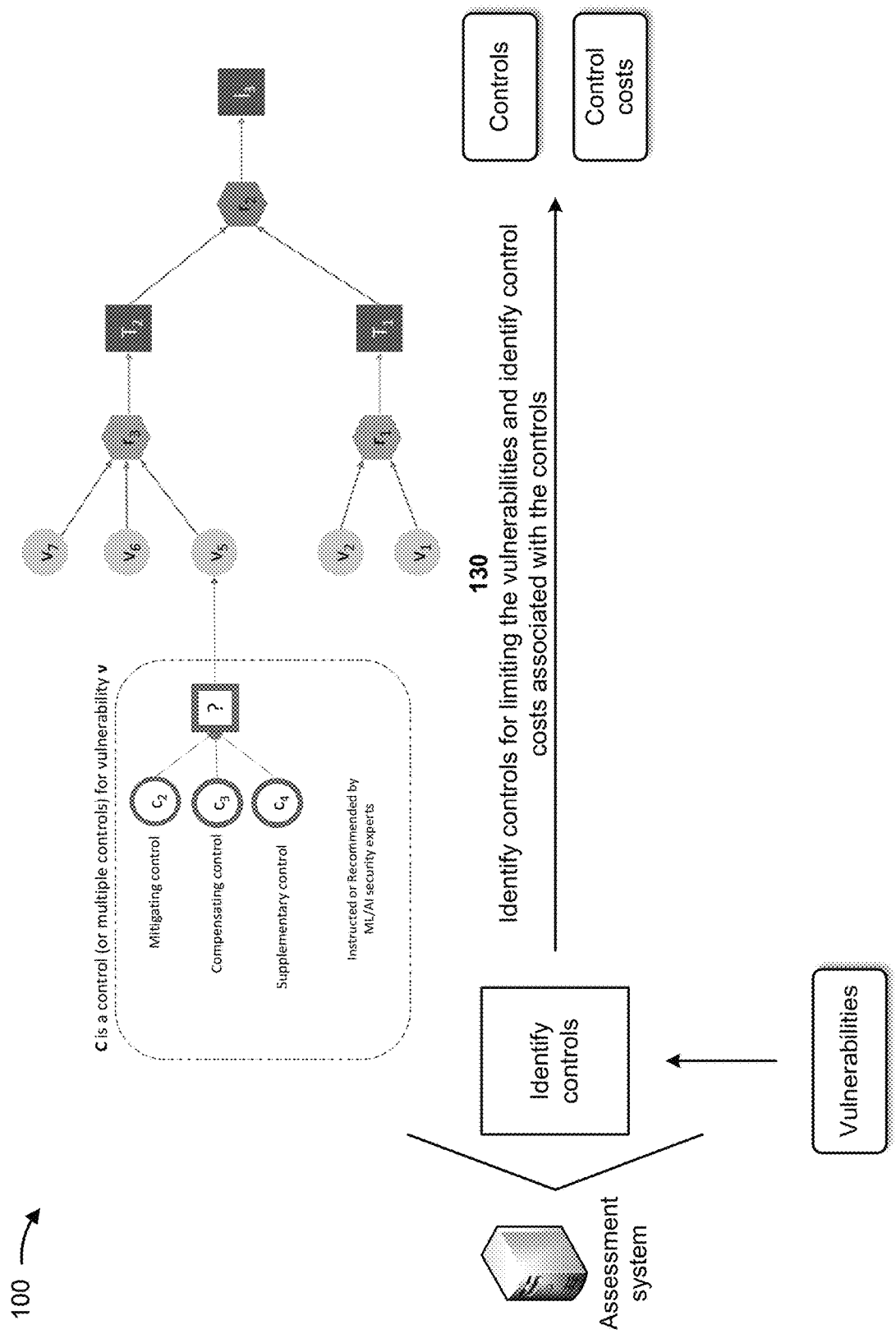

As shown in FIG. 1G, and by reference number 130, the assessment system may identify controls for limiting the vulnerabilities and may identify control costs associated with the controls. For example, when identifying the controls for limiting the vulnerabilities, the assessment system may identify and remove poisoned data associated with the training data, may identify defensive capabilities for vulnerabilities associated with adversarial attacks, may identify secure training data as a defense for vulnerabilities associated with membership inference attacks, may identify a secure application programming interface (API) as a defense to vulnerabilities associated with model extraction attacks, and/or the like. In some implementations, each of the controls may include a control cost associated with time, hardware utilization, software utilization, and/or the like.

In one control example, if the data veracity assessment component identifies poisoned data in the training data, the data sanitization component of the assessment system may remove the identified poisoned data from the training data. In some implementations, the assessment system may provide, to the user device and/or to users associated with the machine learning model, notifications (e.g., email messages, instant messages, and/or the like) indicating that the training data includes the poisoned data, may validate the training data without the poisoned data, may backup the training data without the poisoned data, may audit the training data, and/or the like.

When providing the defensive capabilities for the adversarial attacks, the assessment system may perform adversarial robustness checks by generating multiple adversarial attacks to show a robustness of the machine learning model to diverse types of adversarial attacks. The assessment system may add the adversarial attacks into the training data in order to increase the robustness of the machine learning model. For example, the assessment system may utilize Madry's adversarial training method to generate the adversarial examples, adjust labels of the adversarial examples, and add the adversarial examples to the training data. The machine learning model may be retrained based on the added adversarial examples to make the machine learning model more robust to the adversarial examples.

When providing the defensive capabilities for the adversarial attacks, the assessment system may perform input hardening to increase difficulty for attackers and to break weak adversarial attacks. For example, the assessment system may utilize input transformations (e.g., randomly selected from a library of transformations) to smooth out perturbations in the training data, may utilize adversarial training to improve robustness of the machine learning model, may utilize adversarial detection to detect newly submitted input data that appears to attempt to cause unstable performance for the machine learning model, and/or the like. With regard to input transformations, the assessment system may utilize ridge aggression to identify interactions between input transformations. For example, the assessment system may generate a model that is fitted, provides meaningful information about a strength of each interaction between input transformations, and predicts an effectiveness of different input transformation ensembles. In some implementations, the assessment system may utilize computational cost to determine the defensive capabilities for the adversarial attacks.

When providing the defensive capabilities for the adversarial attacks, the assessment system may utilize input transformation as one of the defensive capabilities, may utilize reconstruction as one of the defensive capabilities, may utilize a decision boundary as one of the defensive capabilities, and/or may utilize an ensemble model (e.g., that includes input transformation, reconstruction, and decision boundary) as one of the defensive capabilities. Input transformation is described above. Reconstruction may include determining a difference between an original image and a reconstruction of the original image. Reconstruction may utilize an image-to-image translation method (e.g., a pix2pix package method) to determine the difference. For example, if a landscape is to be converted from day to night, the assessment system may train a pix2pix model using images of the same locations in day and night, and may apply the pix2pix model to a target image. In another example, the assessment system may train the pix2pix model to reconstruct an original image, and may measure a distance from the original image or a reconstruction loss. A threshold may be utilized with the reconstruction loss to determine whether an image is an adversarial example. A decision boundary may include a boundary that partitions a vector space into two sets, one set for each class. A classifier may classify all points on one side of the decision boundary as belonging to one class and all points on another side of the decision boundary as belonging to another class. A decision boundary is the region of a problem space in which an output label of a classifier is ambiguous.

When providing the defensive capabilities for the adversarial attacks, the assessment system may utilize input preprocessing (e.g., utilize the library of input transformations with no modifications to the machine learning model) as a defensive capability, may utilize model robustness (e.g., replacing weights of the machine learning model with more robust weights or changing/converting the machine learning model architecture to be more robust) as a defensive capability, may utilize post-processing analysis (e.g., detecting abnormal behavior occurring from a same machine learning model interaction) as a defensive capability, and/or the like.

The assessment system may provide the secure training data as the defense for the membership inference attacks by generating training data that prevents the machine learning model from generating inferences about the training data, by modifying the training data to prevent the machine learning model from generating inferences about the training data, and/or the like. For example, the assessment system may reduce overfitting of the training data as a defense for the membership inference attacks, may utilize ensemble models as a defense for the membership inference attacks, may limit information returned by the machine learning model as a defense for the membership inference attacks, may prevent utilization of web applications as a defense for the membership inference attacks, and/or the like.

When providing the secure API as the defense to the model extraction attacks, the assessment system may utilize the secure API to provide access control for the machine learning model. The assessment system may provide access control by limiting access of the secure API to approved users (e.g., domains of subscribers, registered devices, and/or the like), implementing cryptographic mechanisms to protect the confidentiality and integrity of access to the secure API, requiring user authentication/authorization with identities and API security tokens/keys, requiring two-step authentication access to prevent account/credential attacks and abuse, and/or the like.

The assessment system may provide account management for the secure API by prohibiting anonymous/unauthorized API queries, authorizing API least-privileges based on defined attributes for each account, monitoring and disabling accounts in violation of API use notification agreements, enforcing usage conditions of the API by account (e.g., usage duration, restricting usage to certain days/times, query types/endpoints, and/or the like), and/or the like. The assessment system may provide data mining protection for the secure API by employing analytical processes to identify and halt patterns of API access correlated with attempts to extract the machine learning model (e.g., based on query frequency, type, and/or work factor), safeguarding technical API reference information/documentation/architecture from unnecessary exposure, protecting or disabling API caching mechanisms from mining actions, and/or the like.

The assessment system may provide information flow control for the secure API by blocking/sanitizing API queries that do not conform to expected API input (e.g., length, format, content type, and/or illegal content), blocking/stripping API output that contains errors or any other processing failure that discloses information, obfuscating/randomizing API output to minimize information disclosure while retaining fidelity (e.g., strip decimal points or round up/down), and/or the like.

The assessment system may provide concurrent session control by limiting a quantity of concurrent sessions for the API system (e.g., globally, by account type, by account, or any combination thereof), and/or the like. The assessment system may provide penetration testing by conducting penetration testing to validate defenses and identify vulnerable components in the secure API that could be exploited. The assessment system may provide API configuration hardening by managing, applying, and verifying settings to limit functionality of the secure API (e.g., security headers, endpoints, and/or return codes), rate limiting (throttling) a rate of requests coming into the secure API, planning for periodic configuration of baseline validation and vulnerability scanning to mitigate flaws/vulnerabilities in the secure API system and its components, and/or the like.

Figure 1H:
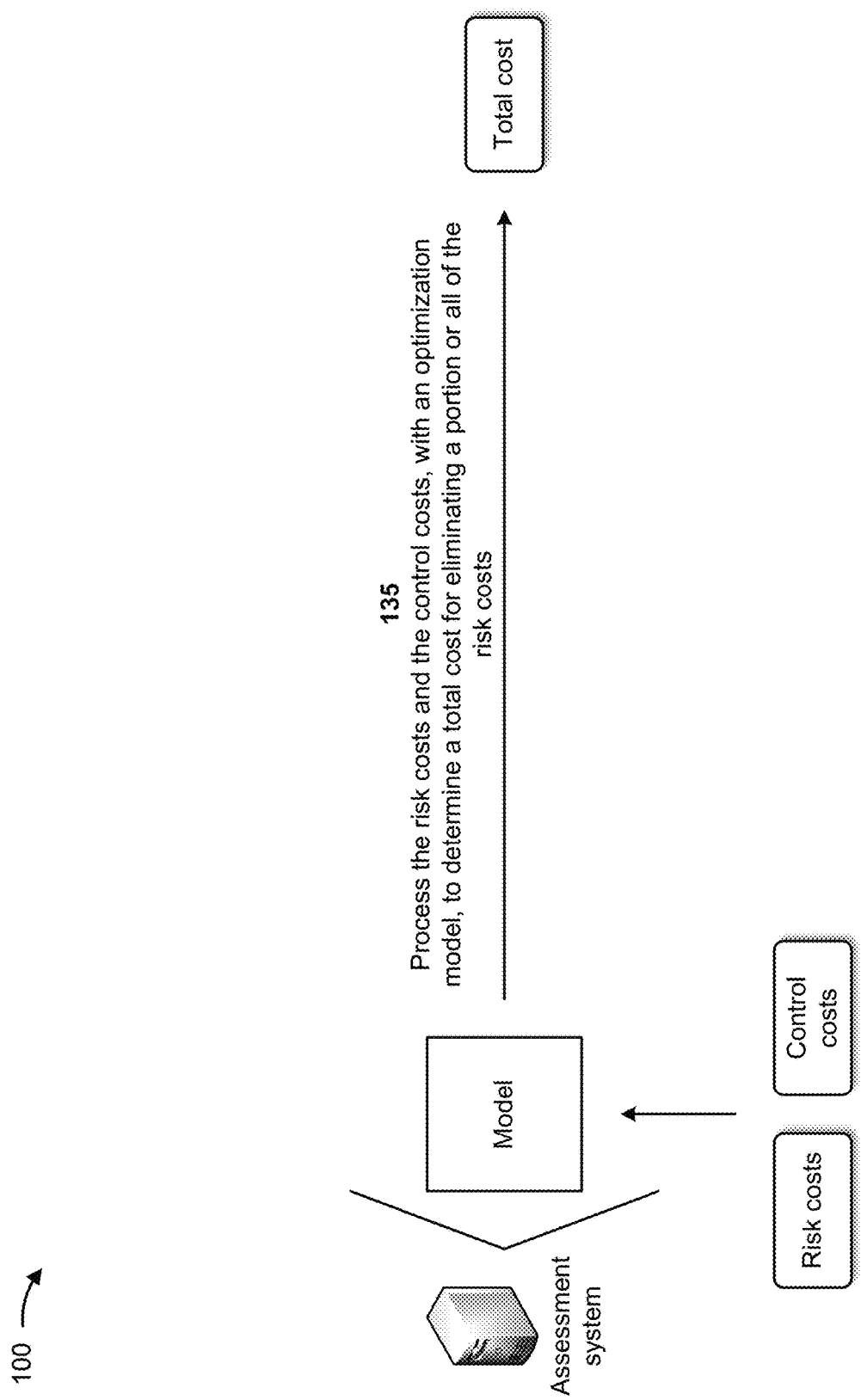

As shown in FIG. 1H, and by reference number 135, the assessment system may process the risk costs and the control costs, with an optimization model, to determine a total cost for eliminating a portion or all of the risk costs. For example, the assessment system may determine, based on the controls and the control costs, fixes (f) that eliminate one or more risk costs (e.g., and associated vulnerabilities and threats) associated with the machine learning model. The optimization model may include a model that attempts to determine an optimal maximum or minimum value of a complex equation. The optimization model may assume that fixes are linearly independent (e.g., any two fixes are independent and will not correct the same vulnerabilities and/or threats), that no causality exists between impacts (e.g., such that fixes that nullify a first impact may also nullify a second impact), and that an attack graph (e.g., a model graph) is acyclic for a specific impact. In some implementations, the optimization model may include an integer linear program (ILP) solver, a greedy model, and/or the like.

For example, the assessment system may determine that three impact costs (i) may be eliminated with controls ($c_j$) associated with fixes ($f_k$) and fix costs ($w_k$), as follows:

$$i_3 = (c_9 + i_2 + c_4) \times (c_4 + i_1 + c_3),$$

$$i_2 = c_1 + c_2,$$

$$i_1 = c_5 + c_6 + c_7, \text{ and}$$

$$c_j = \Sigma f_k w_k.$$

In such an example, the assessment system may nullify all impacts (e.g., all risk costs) by minimizing $\Sigma f_k \cdot w_k$ subject to $i_1, i_2, i_3 \geq 1$ and $f_k = [0, 1]$, and may nullify the third impact ($i_3$) (e.g., a portion of the risk costs) by minimizing $\Sigma f_k \cdot w_k$ subject to $i_3 \geq 1$ and $f_k = [0, 1]$.

Figure 1I:
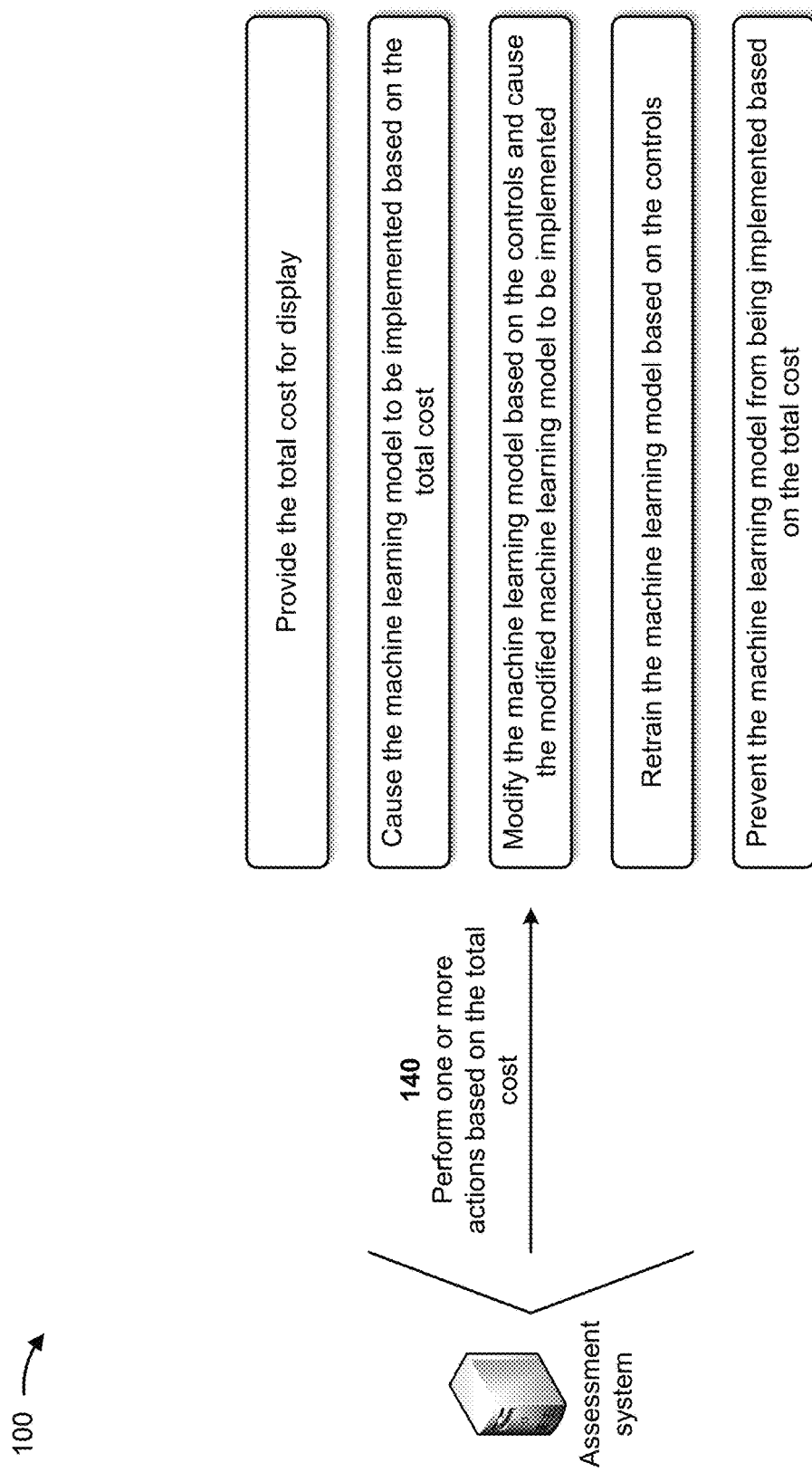

As shown in FIG. 1I, and by reference number 140, the assessment system may perform one or more actions based on the total cost. In some implementations, performing the one or more actions includes the assessment system providing the total cost for display. For example, the assessment system may provide the total cost to the user device. The user device may display the total cost to a user of the user device so that the user may take actions to mitigate one or more attacks on the machine learning model. In this way, the assessment system conserves computing resources, networking resources, and/or the like that would otherwise have been consumed in failing to detect and correct one or more machine learning model attacks.

In some implementations, performing the one or more actions includes the assessment system causing the machine learning model to be implemented based on the total cost. For example, if the assessment system determines that the machine learning model is associated with minimal risk costs or applies controls that nullify the risk costs, the assessment system may determine that the machine learning model is safe to utilize. The assessment system may cause the machine learning model to be implemented in a system, in the user device, and/or the like based on the determination. In this way, the assessment system conserves computing resources, networking resources, and/or the like that would otherwise have been consumed in utilizing incorrect results generated by the compromised machine learning model.

In some implementations, performing the one or more actions includes the assessment system modifying the machine learning model based on the controls and causing the modified machine learning model to be implemented. For example, the assessment system may modify hyperparameters of the machine learning model based on the controls, or may modify the training data for the machine learning model, to generate a modified model. The assessment system may cause the modified machine learning model to be implemented in a system, in the user device, and/or the like. In this way, the assessment system conserves computing resources, networking resources, and/or the like that would otherwise have been consumed in handling theft of confidential information associated with the compromised machine learning model, and/or the like.

In some implementations, performing the one or more actions includes the assessment system retraining the machine learning model based on the controls. For example, the assessment system may utilize the controls as additional training data for retraining the machine learning model, thereby increasing the quantity of training data available for training the machine learning model. Accordingly, the assessment system may conserve computing resources associated with identifying, obtaining, and/or generating historical data for training the machine learning model relative to other systems for identifying, obtaining, and/or generating historical data for training machine learning models.

In some implementations, performing the one or more actions includes the assessment system preventing the machine learning model from being implemented based on the total cost. For example, if the assessment system determines that the machine learning model is associated with significant risk costs, the assessment system may determine that the machine learning model is unsafe to utilize. The assessment system may prevent the machine learning model from being implemented until the machine learning model is not susceptible to the attacks. In this way, the assessment system conserves computing resources, networking resources, and/or the like that would otherwise have been consumed in failing to detect and correct one or more machine learning model attacks, implementing a compromised machine learning model, utilizing incorrect results generated by the compromised machine learning model, and/or the like.

FIG. 1J depicts an example user interface that may be generated by the assessment system. As shown, the user interface may include information associated with a risk assessment of the machine learning model. The risk assessment may include risk information associated with model security risk of the machine learning model, data security risk of the machine learning model, and/or platform security risk of the machine learning model. The risk assessment may also provide indications of potential attacks on the machine learning model (e.g., model extraction attacks, model manipulation attacks, model compromising attacks, data memorization attacks, membership inference attacks, and/or the like). The risk assessment provided by the user interface may enable a user of the assessment system to determine whether to implement the machine learning model in production. The user interface may also include information associated with a risk reduction for the machine learning model. The risk reduction may indicate the risk costs for the machine learning model, the total cost for eliminating a portion or all of the risk costs, and/or the like.

In this way, the assessment system identifies and assesses costs associated with correcting vulnerabilities in machine learning models. The assessment system may identify attacks associated with a machine learning model and vulnerabilities associated with the attacks, and may map the vulnerabilities to threats and the threats to impact costs. The assessment system may determine success rates of the threats, and may calculate probabilities of the threats being successful based on the vulnerabilities and the success rates. The assessment system may calculate risk costs of the attacks based on the probabilities and the impact costs, and may identify controls for limiting the vulnerabilities and control costs associated with the controls. The assessment system may process the risk costs and the control costs, with an optimization model, to determine a total cost for eliminating a portion or all of the risk costs. This, in turn, conserves computing resources, networking resources, and/or the like that would otherwise have been consumed in failing to detect and correct one or more machine learning model attacks, implementing a compromised machine learning model, utilizing incorrect results generated by the compromised machine learning model, handling theft of confidential information associated with the compromised machine learning model, performing expensive and possibly unnecessary processes to correct machine learning attacks, and/or the like.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
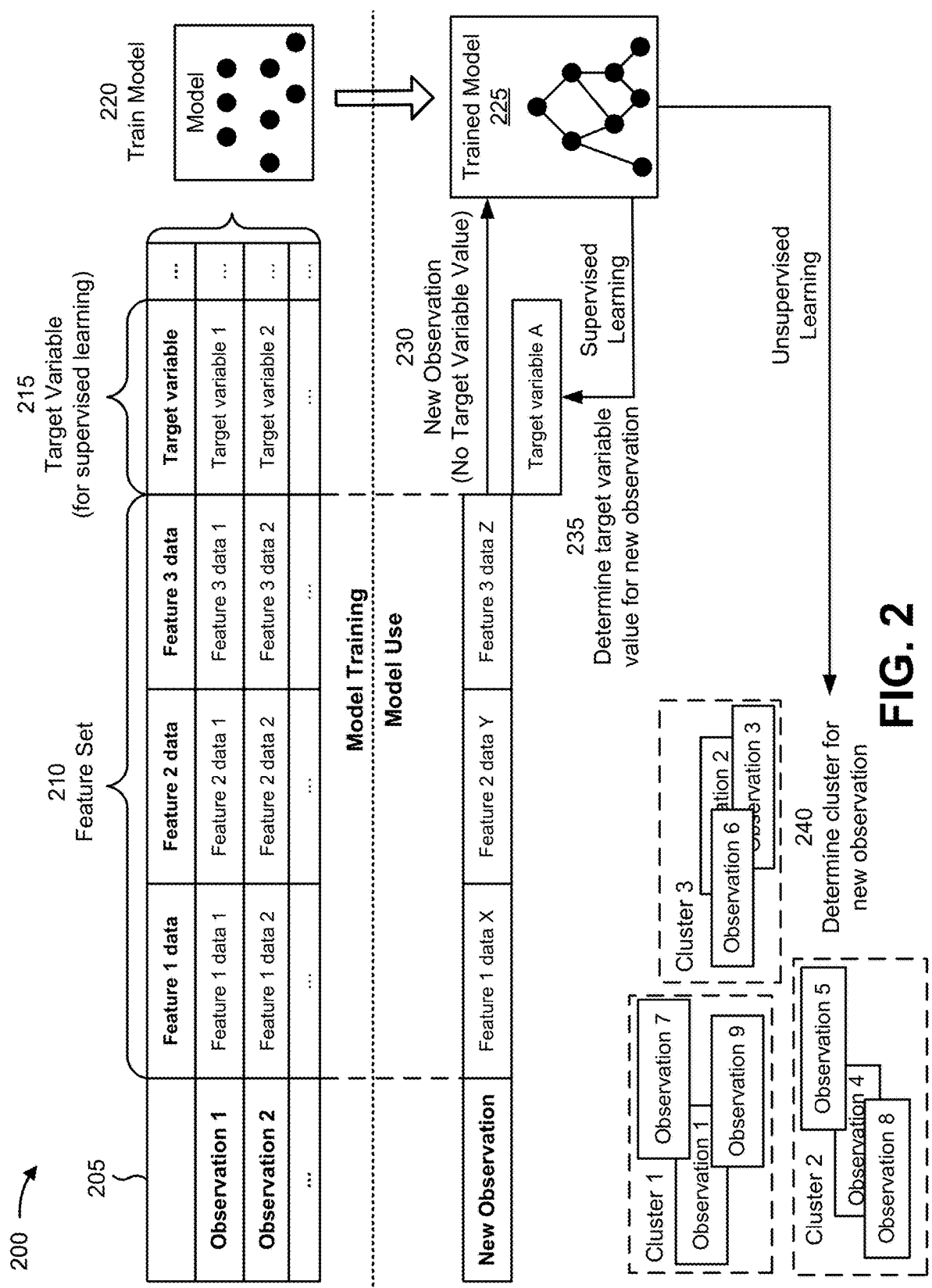
FIG. 2 is a diagram illustrating an example of training and using a machine learning model.

FIG. 2 is a diagram illustrating an example 200 of training and using a machine learning model. The machine learning model training and usage described herein may be performed using a machine learning system. The machine learning system may include or may be included in a computing device, a server, a cloud computing environment, and/or the like, such as the assessment system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the assessment system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the assessment system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of feature 1 data, a second feature of feature 2 data, a third feature of feature 3 data, and so on. As shown, for a first observation, the first feature may have a value of feature 1 data 1, the second feature may have a value of feature 2 data 1, the third feature may have a value of feature 3 data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable has a value of target variable 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of feature 1 data X, a second feature of feature 2 data Y, a third feature of feature 3 data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of target variable A for the target variable of the clustered events for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a feature 1 data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a feature 2 data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine a target variable. The machine learning system enables recognition and/or identification of tens, hundreds, thousands, or millions of features and/or feature values for tens, hundreds, thousands, or millions of observations, thereby increasing accuracy and consistency and reducing delay associated with determining a target variable relative to requiring computing resources to be allocated for tens, hundreds, or thousands of operators to manually determine a target variable.

As indicated above, FIG. 2 is provided as an example. Other examples may differ from what is described in connection with FIG. 2.

Figure 3:
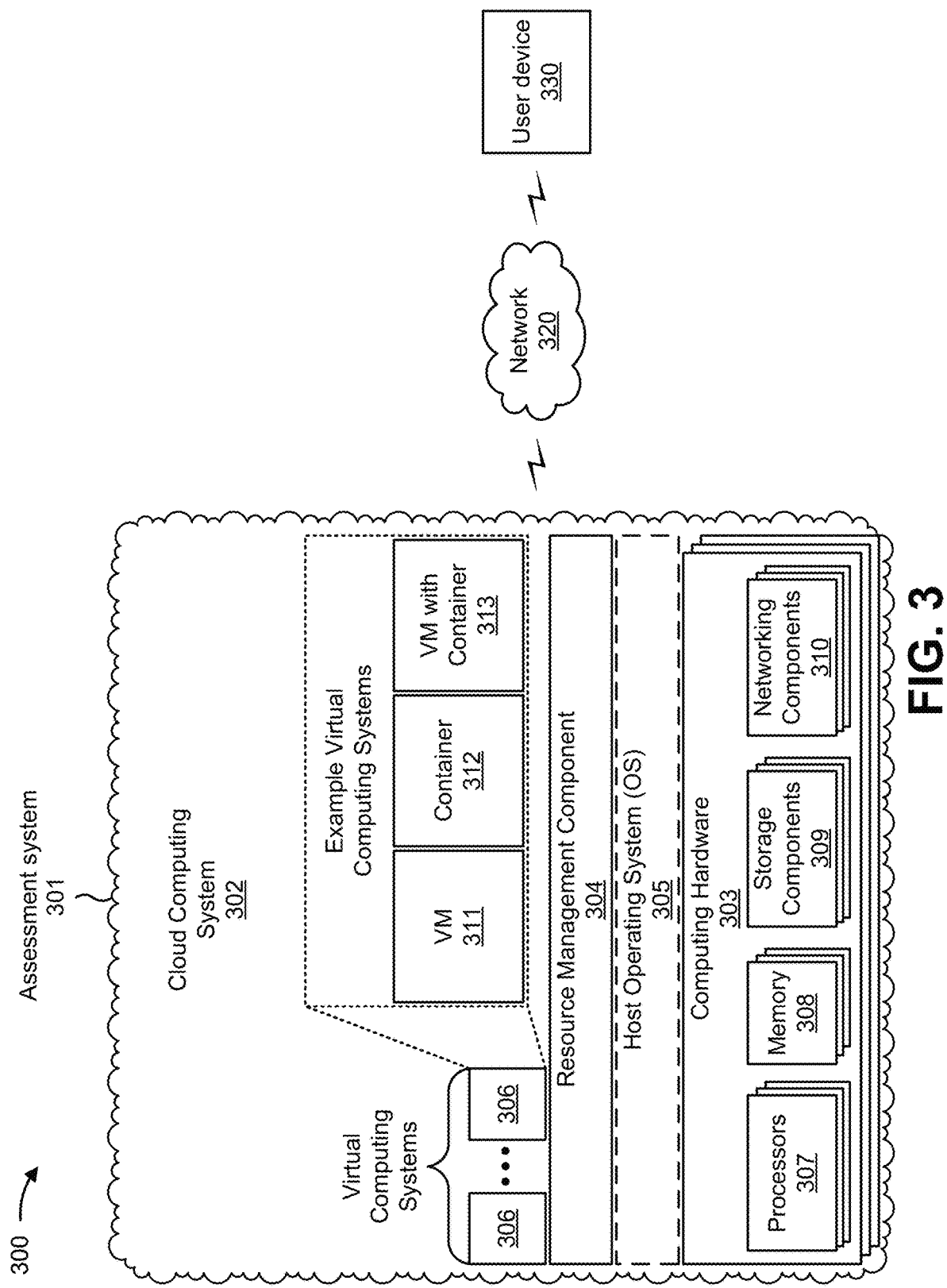
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include an assessment system 301, which may include one or more elements of and/or may execute within a cloud computing system 302. The cloud computing system 302 may include one or more elements 303-313, as described in more detail below. As further shown in FIG. 3, the environment 300 may include a network 320 and/or a user device 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers.

As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the assessment system 301 may include one or more elements 303-313 of the cloud computing system 302, may execute within the cloud computing system 302, and/or may be hosted within the cloud computing system 302, in some implementations, the assessment system 301 may not be cloud-based (e.g., may be implemented outside of a cloud computing system) or may be partially cloud-based. For example, the assessment system 301 may include one or more devices that are not part of the cloud computing system 302, such as a device 400 of FIG. 4, which may include a standalone server or another type of computing device. The assessment system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The user device 330 includes one or more devices capable of receiving, generating, storing, processing, and/or providing information, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
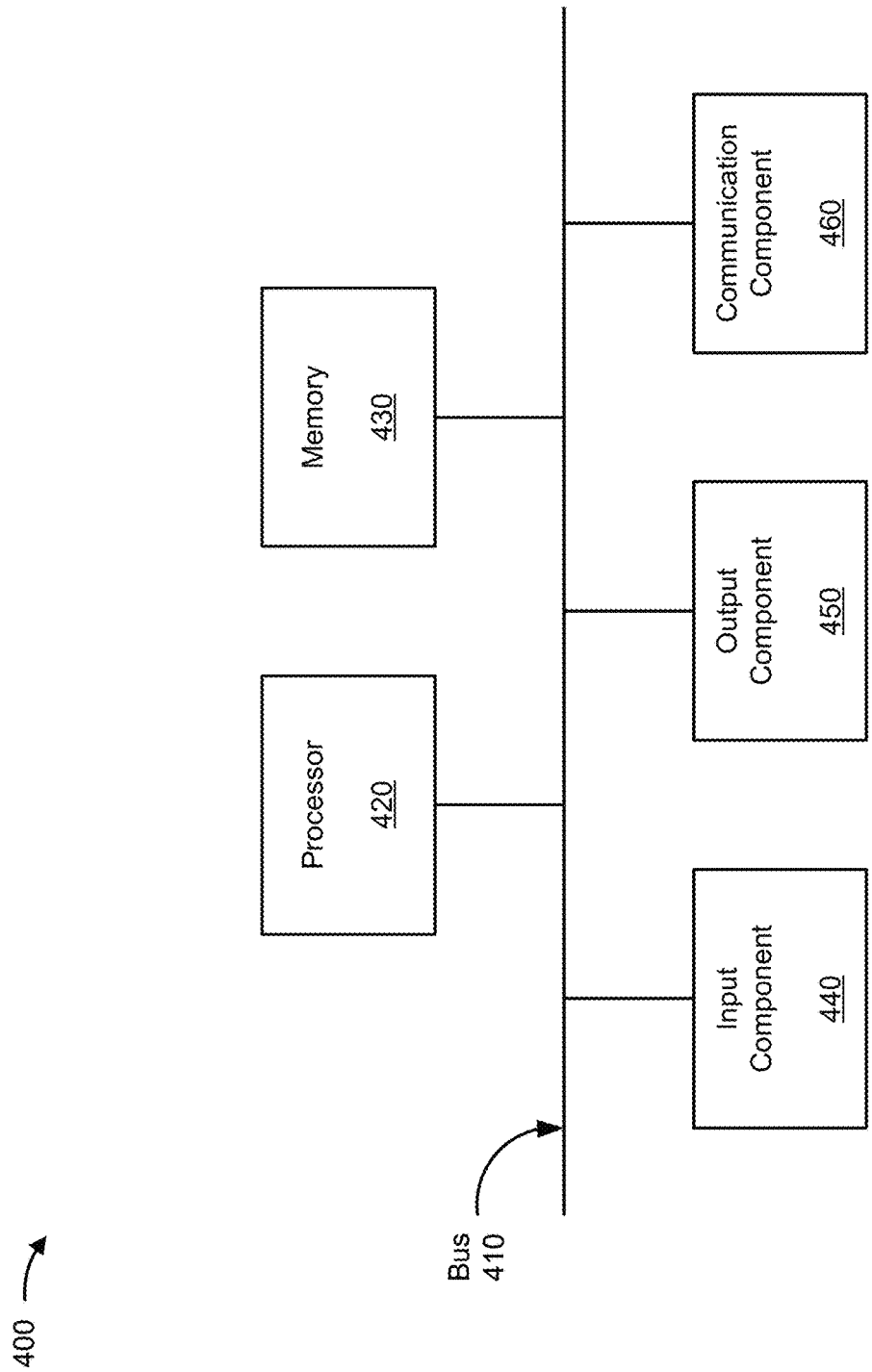
FIG. 4 is a diagram of example components of one or more devices of FIG. 3.

FIG. 4 is a diagram of example components of a device 400, which may correspond to the assessment system 301 and/or the user device 330. In some implementations, the assessment system 301 and/or the user device 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
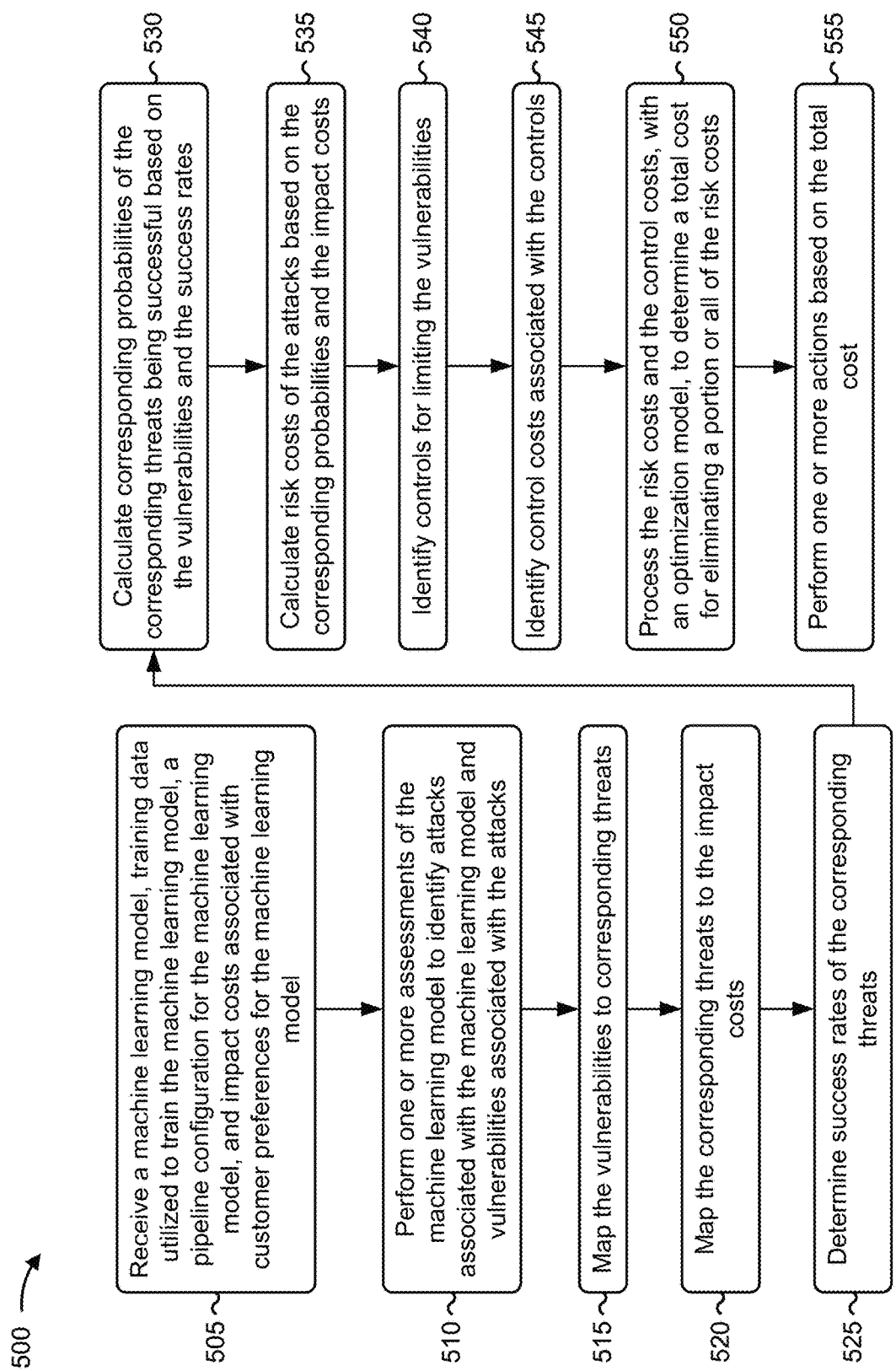
FIG. 5 is a flowchart of an example process for identifying and assessing costs associated with correcting vulnerabilities in machine learning models.

FIG. 5 is a flowchart of an example process 500 for identifying and assessing costs associated with correcting vulnerabilities in machine learning models. In some implementations, one or more process blocks of FIG. 5 may be performed by a device (e.g., the assessment system 301). In some implementations, one or more process blocks of FIG. 5 may be performed by another device or a group of devices separate from or including the device, such as a user device (e.g., the user device 330). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving a machine learning model, training data utilized to train the machine learning model, a pipeline configuration for the machine learning model, and impact costs associated with customer preferences for the machine learning model (block 505). For example, the device may receive a machine learning model, training data utilized to train the machine learning model, a pipeline configuration for the machine learning model, and impact costs associated with customer preferences for the machine learning model, as described above.

As further shown in FIG. 5, process 500 may include performing one or more assessments of the machine learning model to identify attacks associated with the machine learning model and vulnerabilities associated with the attacks (block 510). For example, the device may perform one or more assessments of the machine learning model to identify attacks associated with the machine learning model and vulnerabilities associated with the attacks, as described above. In some implementations, performing the one or more assessments of the machine learning model to identify the attacks associated with the machine learning model and the vulnerabilities associated with the attacks includes one or more of performing a data veracity assessment of the training data to identify data veracity attacks associated with the training data; performing an adversarial example assessment of the machine learning model to identify adversarial attacks associated with the machine learning model; performing a membership inference assessment of the machine learning model to identify membership inference attacks associated with the machine learning model; or performing a model extraction assessment of the machine learning model to identify model extraction attacks associated with the machine learning model.

As further shown in FIG. 5, process 500 may include mapping the vulnerabilities to corresponding threats (block 515). For example, the device may map the vulnerabilities to corresponding threats, as described above. In some implementations, mapping the vulnerabilities to the corresponding threats includes utilizing a graph model with logical relations to map the vulnerabilities to the corresponding threats. In some implementations, each of the corresponding threats includes properties associated with one or more of an accuracy of the machine learning model, a threat severity, or one of the customer preferences.

As further shown in FIG. 5, process 500 may include mapping the corresponding threats to the impact costs (block 520). For example, the device may map the corresponding threats to the impact costs, as described above. In some implementations, mapping the corresponding threats to the impact costs includes utilizing a graph model with logical relations to map the corresponding threats to the impact costs.

As further shown in FIG. 5, process 500 may include determining success rates of the corresponding threats (block 525). For example, the device may determine success rates of the corresponding threats, as described above. In some implementations, determining the success rates of the corresponding threats includes assigning corresponding success rates to the corresponding threats, and assigning weights to the corresponding success rates to determine the success rates of the corresponding threats, where the weights indicate difficulties associated with the corresponding threats.

As further shown in FIG. 5, process 500 may include calculating corresponding probabilities of the corresponding threats being successful based on the vulnerabilities and the success rates (block 530). For example, the device may calculate corresponding probabilities of the corresponding threats being successful based on the vulnerabilities and the success rates, as described above. In some implementations, calculating the corresponding probabilities of the corresponding threats being successful based on the vulnerabilities and the success rates includes calculating vulnerability probabilities of the vulnerabilities being successful based on the success rates, and combining the vulnerability probabilities to calculate the corresponding probabilities of the corresponding threats being successful.

As further shown in FIG. 5, process 500 may include calculating risk costs of the attacks based on the corresponding probabilities and the impact costs (block 535). For example, the device may calculate risk costs of the attacks based on the corresponding probabilities and the impact costs, as described above. In some implementations, calculating the risk costs of the attacks based on the corresponding probabilities and the impact costs includes multiplying the corresponding probabilities and the impact costs to calculate the risk costs of the attacks. In some implementations, each of the risk costs is based on one or more of a privacy factor identified in the customer preferences, a security factor identified in the customer preferences, an availability factor identified in the customer preferences, the training data, a type of the machine learning model, or a platform hosting the machine learning model.

As further shown in FIG. 5, process 500 may include identifying controls for limiting the vulnerabilities (block 540). For example, the device may identify controls for limiting the vulnerabilities, as described above. In some implementations, identifying controls for limiting the vulnerabilities includes one or more of identifying and remove poisoned data associated with the training data; identifying defensive capabilities for vulnerabilities associated with adversarial attacks; identifying secure training data as a defense for vulnerabilities associated with membership inference attacks; or identifying a secure application programming interface as a defense to vulnerabilities associated with model extraction attacks.

As further shown in FIG. 5, process 500 may include identifying control costs associated with the controls (block 545). For example, the device may identify control costs associated with the controls, as described above.

As further shown in FIG. 5, process 500 may include processing the risk costs and the control costs, with an optimization model, to determine a total cost for eliminating a portion or all of the risk costs (block 550). For example, the device may process the risk costs and the control costs, with an optimization model, to determine a total cost for eliminating a portion or all of the risk costs, as described above. In some implementations, processing the risk costs and the control costs, with the optimization model, to determine the total cost for eliminating the portion or all of the risk costs includes receiving an input total cost, and processing the risk costs and the control costs, with the optimization model, to determine the portion of the risk costs to eliminate based on the input total cost.

As further shown in FIG. 5, process 500 may include performing one or more actions based on the total cost (block 555). For example, the device may perform one or more actions based on the total cost, as described above. In some implementations, performing the one or more actions includes one or more of providing the total cost for display, causing the machine learning model to be implemented based on the total cost, retraining the machine learning model based on the controls, or preventing the machine learning model from being implemented based on the total cost. In some implementations, performing the one or more actions includes modifying the machine learning model based on the controls, and causing the modified machine learning model to be implemented.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, a machine learning model, training data utilized to train the machine learning model, and impact costs associated with customer preferences for the machine learning model;
   performing, by the device, one or more assessments of the machine learning model to identify attacks associated with the machine learning model and vulnerabilities associated with the attacks, wherein each of the vulnerabilities is associated with security or privacy of the machine learning model;
   mapping, by the device, the vulnerabilities to corresponding threats, wherein
     each threat of the corresponding threats causes negative impacts on the machine learning model,
     the vulnerabilities are mapped to the corresponding threats by utilizing a graph model with logical relations between the vulnerabilities and the corresponding threats, and
     each node of the graph model represents a vulnerability of the vulnerabilities or a threat of the corresponding threats;
   mapping, by the device, the corresponding threats to the impact costs;
   determining, by the device, success rates of the corresponding threats;
   calculating, by the device, corresponding probabilities of the corresponding threats being successful based on the vulnerabilities and the success rates;
   calculating, by the device, risk costs of the attacks based on the corresponding probabilities and the impact costs;
   identifying, by the device, controls for limiting the vulnerabilities;
   identifying, by the device, control costs associated with the controls;
   processing, by the device, the risk costs and the control costs, with an optimization model, to determine a total cost for eliminating a portion or all of the risk costs, wherein the optimization model solves a function for determining the total cost by eliminating the portion or all of the risk costs based on the controls and the control costs; and
   performing, by the device, one or more actions related to the total cost that is associated with the risk costs and the control costs.

2. The method of claim 1, wherein performing the one or more assessments of the machine learning model to identify the attacks associated with the machine learning model and the vulnerabilities associated with the attacks comprises one or more of:

performing a data veracity assessment of the training data to identify data veracity attacks associated with the training data;

performing an adversarial example assessment of the machine learning model to identify adversarial attacks associated with the machine learning model;

performing a membership inference assessment of the machine learning model to identify membership inference attacks associated with the machine learning model; or performing a model extraction assessment of the machine learning model to identify model extraction attacks associated with the machine learning model.

3. The method of claim 1, wherein mapping the corresponding threats to the impact costs comprises:
utilizing the graph model with logical relations to map the corresponding threats to the impact costs.

4. The method of claim 1, wherein determining the success rates of the corresponding threats comprises:
assigning corresponding success rates to the corresponding threats; and
assigning weights to the corresponding success rates to determine the success rates of the corresponding threats, wherein the weights indicate difficulties associated with the corresponding threats.

5. The method of claim 1, wherein calculating the corresponding probabilities of the corresponding threats being successful based on the vulnerabilities and the success rates comprises:
calculating vulnerability probabilities of the vulnerabilities being successful based on the success rates; and
combining the vulnerability probabilities to calculate the corresponding probabilities of the corresponding threats being successful.

6. The method of claim 1, wherein calculating the risk costs of the attacks based on the corresponding probabilities and the impact costs comprises:
multiplying the corresponding probabilities and the impact costs to calculate the risk costs of the attacks.

7. The method of claim 1, wherein identifying controls for limiting the vulnerabilities comprises:
identifying poisoned data in the training data by utilizing a plurality of models based on a plurality of types of the training data, wherein
the plurality of models includes a first model and the second model,
the plurality of types of the training data includes a first type of the training data and a second type of the training data, and
the first model utilized for removing poisoned data from the first type of the training data is different from the second model utilized for removing poisoned data from the second type of the training data.

8. A device, comprising:
one or more memories; and
one or more processors, coupled to the one or more memories, configured to:
receive a machine learning model, training data utilized to train the machine learning model, and impact costs associated with customer preferences for the machine learning model;
perform one or more assessments of the machine learning model to identify attacks associated with the machine learning model and vulnerabilities associated with the attacks, wherein each of the vulnerabilities is associated with security or privacy of the machine learning model;
utilize a graph model with logical relations to map the vulnerabilities to corresponding threats, wherein
each threat of the corresponding threats causes negative impacts on the machine learning model, and
each node of the graph model represents a vulnerability of the vulnerabilities or a threat of the corresponding threats;
utilize the graph model with the logical relations to map the corresponding threats to the impact costs;
determine success rates of the corresponding threats;
calculate corresponding probabilities of the corresponding threats being successful based on the vulnerabilities and the success rates;
calculate risk costs of the attacks based on the corresponding probabilities and the impact costs;
identify controls for limiting the vulnerabilities;
identify control costs associated with the controls;
process the risk costs and the control costs, with an optimization model, to determine a total cost for eliminating a portion or all of the risk costs, wherein the optimization model solves a function for determining the total cost by eliminating the portion or all of the risk costs based on the controls and the control costs; and
perform one or more actions related to the total cost that is associated with the risk costs and the control costs.

9. The device of claim 8, wherein each of the corresponding threats includes properties associated with one or more of:
an accuracy of the machine learning model,
a threat severity, or
one of the customer preferences.

10. The device of claim 8, wherein each of the risk costs is based on one or more of:
a privacy factor identified in the customer preferences,
a security factor identified in the customer preferences,
an availability factor identified in the customer preferences,
the training data,
a type of the machine learning model, or
a platform hosting the machine learning model.

11. The device of claim 8, wherein the one or more processors, to identify the controls for limiting the vulnerabilities, are configured to one or more of:
identify and remove poisoned data associated with the training data;
identify defensive capabilities for vulnerabilities associated with adversarial attacks;
identify secure training data as a defense for vulnerabilities associated with membership inference attacks; or
identify a secure application programming interface as a defense to vulnerabilities associated with model extraction attacks.

12. The device of claim 8, wherein the one or more processors, to process the risk costs and the control costs, with the optimization model, to determine the total cost for eliminating the portion or all of the risk costs, are configured to:
receive an input total cost; and
process the risk costs and the control costs, with the optimization model, to determine the portion of the risk costs to eliminate based on the input total cost.

13. The device of claim 8, wherein the one or more processors, to perform the one or more actions, are configured to one or more of:
provide the total cost for display;

cause the machine learning model to be implemented based on the total cost;
retrain the machine learning model based on the controls; or
prevent the machine learning model from being implemented based on the total cost.

14. The device of claim 8, wherein the one or more processors, to perform the one or more actions, are configured to:
modify the machine learning model based on the controls; and
cause the modified machine learning model to be implemented.

15. A non-transitory computer-readable medium storing a set of instructions, the set of instructions comprising:
one or more instructions that, when executed by one or more processors of a device, cause the device to:
receive a machine learning model, training data utilized to train the machine learning model, and impact costs associated with customer preferences for the machine learning model;
perform one or more assessments of the machine learning model to identify attacks associated with the machine learning model and vulnerabilities associated with the attacks, wherein each of the vulnerabilities is associated with security or privacy of the machine learning model,
wherein the attacks include one or more of:
data veracity attacks associated with the training data,
adversarial attacks associated with the machine learning model,
membership inference attacks associated with the machine learning model, or
model extraction attacks associated with the machine learning model;
map the vulnerabilities to corresponding threats, wherein
each threat of the corresponding threats causes negative impacts on the machine learning model,
the vulnerabilities are mapped to the corresponding threats by utilizing a graph model with logical relations between the vulnerabilities and the corresponding threats, and
each node of the graph model represents a vulnerability of the vulnerabilities or a threat of the corresponding threats;
map the corresponding threats to the impact costs;
determine success rates of the corresponding threats;
calculate corresponding probabilities of the corresponding threats being successful based on the vulnerabilities and the success rates;
calculate risk costs of the attacks based on the corresponding probabilities and the impact costs;
identify controls for limiting the vulnerabilities;
identify control costs associated with the controls;
process the risk costs and the control costs, with an optimization model, to determine a total cost for eliminating a portion or all of the risk costs, wherein the optimization model solves a function for determining the total cost by eliminating the portion or all of the risk costs based on the controls and the control costs; and
perform one or more actions related to the total cost that is associated with the risk costs and the control costs.

16. The non-transitory computer-readable medium of claim 15, wherein the one or more instructions, that cause the device to determine the success rates of the corresponding threats, cause the device to:
assign corresponding success rates to the corresponding threats; and
assign weights to the corresponding success rates to determine the success rates of the corresponding threats, wherein the weights indicate difficulties associated with the corresponding threats.

17. The non-transitory computer-readable medium of claim 15, wherein the one or more instructions, that cause the device to calculate the corresponding probabilities of the corresponding threats being successful based on the vulnerabilities and the success rates, cause the device to:
calculate vulnerability probabilities of the vulnerabilities being successful based on the success rates; and
combine the vulnerability probabilities to calculate the corresponding probabilities of the corresponding threats being successful.

18. The non-transitory computer-readable medium of claim 15, wherein the one or more instructions, that cause the device to calculate the risk costs of the attacks based on the corresponding probabilities and the impact costs, cause the device to:
multiply the corresponding probabilities and the impact costs to calculate the risk costs of the attacks.

19. The non-transitory computer-readable medium of claim 15, wherein the one or more instructions, that cause the device to identify the controls for limiting the vulnerabilities, cause the device to:
identify and remove poisoned data associated with the training data;
identify defensive capabilities for vulnerabilities associated with adversarial attacks;
identify secure training data as a defense for vulnerabilities associated with membership inference attacks; or
identify a secure application programming interface as a defense to vulnerabilities associated with model extraction attacks.

20. The non-transitory computer-readable medium of claim 15, wherein the one or more instructions, that cause the device to process the risk costs and the control costs, with the optimization model, to determine the total cost for eliminating the portion or all of the risk costs, cause the device to:
receive an input total cost; and
process the risk costs and the control costs, with the optimization model, to determine the portion of the risk costs to eliminate based on the input total cost.

* * * * *